United States Patent [19]

Dunshee

[11] 4,097,713
[45] Jun. 27, 1978

[54] PLASMA ARC CUTTING WATER TABLES
[75] Inventor: Robert S. Dunshee, Whittier, Calif.
[73] Assignee: United States Steel Corporation, Pittsburgh, Pa.
[21] Appl. No.: 651,484
[22] Filed: Jan. 21, 1976
[51] Int. Cl.² ................................................ B23K 7/06
[52] U.S. Cl. ................... 219/121 P; 148/9 R; 219/160; 219/158; 269/286; 266/65
[58] Field of Search ............... 219/121 P, 158, 68; 266/49, 65; 269/286, 296, 299, 301, 302; 339/12 R, 12 G, 14 L; 148/9 R, 9 C, 9.5; 248/346, 174

[56] References Cited

U.S. PATENT DOCUMENTS

| | | | |
|---|---|---|---|
| 2,312,083 | 2/1943 | Doane | 219/158 |
| 2,489,475 | 11/1949 | Blind | 339/12 G |
| 2,890,883 | 6/1959 | Brookhouser | 269/296 |
| 3,430,837 | 3/1969 | Hein | 219/136 |
| 3,500,283 | 3/1970 | Bishop | 339/12 G |
| 3,536,888 | 10/1970 | Borneman | 219/130 |
| 3,787,247 | 1/1974 | Couch, Jr. | 266/65 X |
| 3,941,361 | 3/1976 | Cranston | 269/296 X |
| 3,944,203 | 3/1976 | Brekelbaum | 269/296 X |

FOREIGN PATENT DOCUMENTS 2,219,789  4/1973  Germany ............... 266/65

Primary Examiner—Arthur T. Grimley
Assistant Examiner—Mark H. Paschall
Attorney, Agent, or Firm—William A. Danchuk

[57] ABSTRACT

A water-filled cutting table for a plasma-arc torch cutting arrangement is configured having a plurality of self-extinguishing and combustibly non-supportive slats oriented on edge and transverse to the direction of travel of the torch arrangement. Magnetic grounding elements are also provided for electrically grounding each piece of product to be cut. The use of self-extinguishing and combustibly non-supportive materials for the product support slats drastically reduces the amount of undesirable slag build-up on the slats which had heretofore created problems of proper product support and, consequently, decreased product quality.

15 Claims, 7 Drawing Figures

PLASMA ARC CUTTING WATER TABLES

BACKGROUND OF THE INVENTION

Plasma arc cutting torches, better known as plasma jets, have been known and used in the metal industry for some time. However, due to high equipment cost and obnoxious fumes emanating during the cutting operation, the early model plasma jets were used only in large industries capable of coping with such problems. Recently, however, advances in various areas have contributed to the broadened application base for plasma-jet cutting. One of these advances has been the introduction of a water-filled cutting table for plasma jets.

The water-filled cutting table supports the product to be cut at a position just over or just under the surface of the water. Consequently, there is a drastic reduction in the amount of obnoxious fumes emanating from the cutting operation due to the entrapment of a majority of the particulates in the water reservoir.

The tables are basically water-tight, rectangular-shaped containers filled with water and having lengths and widths greater than the corresponding dimensions of the product to be cut. Steel slats periodically span the width of the container in a direction substantially normal to the direction of travel of the plasma jet or jets. Such steel slats serve a double function. First, the steel slats, placed on edge, support the product close to the water surface. Secondly, and possibly more importantly, the steel acts as an electrical connector between an electrical ground and the steel product being cut. Due to the specific manner in which plasma jets operate, the electrode of the plasma jet is a cathode, while the workpiece or product to be cut is the anode and must be grounded. The water tables currently used in industry have added immensely to the plasma jets application to many fields. However, there are a few disadvantages realized during their operation which retard the efficient employment of the plasma jets.

Specifically, the use of steel slats within the cutting table to both support and electrically ground the product leads to the undesirable build-up of slag from the cut product onto the slats. This results in an unevenness to the tops of the slats and an uneven support base for the product. Moreover, due to the build-up of slag between the product and the slat, the product is not thoroughly grounded. It has been found to be time consuming, and hence expensive to clean the supporting slats and is not safety oriented.

SUMMARY OF THE INVENTION

The present invention is addressed to an improved type of plasma-jet cutting table. The water-filled table is configured having a plurality of slats arranged on edge and extending across the width of the tank in a direction parallel to the width of the tank or container. The slats are located approximately every foot for supporting the product. However, the slats employed in the cutting table according to the present invention are not formed from steel or the like but from materials which are characterized in being self-extinguishing and combustibly non-supportive. Contained within this category are materials such as polyvinyl chloride, Nylon, Zytel (6/12 or 6/6 Nylon), Teflon T.F.E. (polytetrafluoroethylene) and glass reinforced Valox (polybutyleneterathylate). Additionally, steel slats having a substantial edge coating of the above-noted materials may be incorporated in the present application. The materials just mentioned have, as a common characteristic, the lack of any quality which would permit the slag resulting from the product cutting operation to adhere thereto. Consequently, any slag resulting during the cutting operation will not stick to the slat, thereby avoiding any interference with subsequent planar and level product support.

Due to the use of materials which are electrically non-conductive, the cutting table according to the present invention includes a plurality of releasably attachable grounding elements which are equal in number to the number of pieces into which the product is to be cut. In the preferred embodiment of the invention, these elements are magnetically attachable to the product and are connected to an electrical ground. The use of the magnetic grounding elements 40 precludes the development of a grounding loop, causing current feedback to the power supply for the plasma-jet arrangement.

It is therefore a primary object and feature of the present invention to provide a water-filled cutting table for a plasma-jet cutting arrangement, the table being so configured that slag build-up on the product support portions of the table is negligible.

It is a further primary object and feature of the present invention to provide a cutting table for a plasma-jet cutting arrangement, the table being configured having self-extinguishing and combustibly non-supportive product support elements and independent electrical grounding devices which are attachable to the product to be cut.

It is another object and feature of the present invention to provide a water-filled cutting table for a plasma-jet cutting arrangement, the table including product support slats formed from polyvinyl chloride such that the slag from the product being cut does not adhere to the slat, said table also including devices for electrically grounding the product to be cut.

Other objects and features will, in part, be obvious and will, in part, become apparent as the following description proceeds. The features of novelty which characterize the invention will be pointed out with particularity in the claims annexed to and forming part of the specification.

BRIEF DESCRIPTION OF THE DRAWINGS

The novel features that are considered characteristic of the invention are set forth with particularity in the appended claims. The invention itself, however, both as to its structure and its operation together with additional objects and advantages thereof will best be understood from the following description of the preferred embodiment of the invention when read in conjunction with the accompanying drawings wherein:

DETAILED DESCRIPTION OF THE INVENTION

Figure 1:
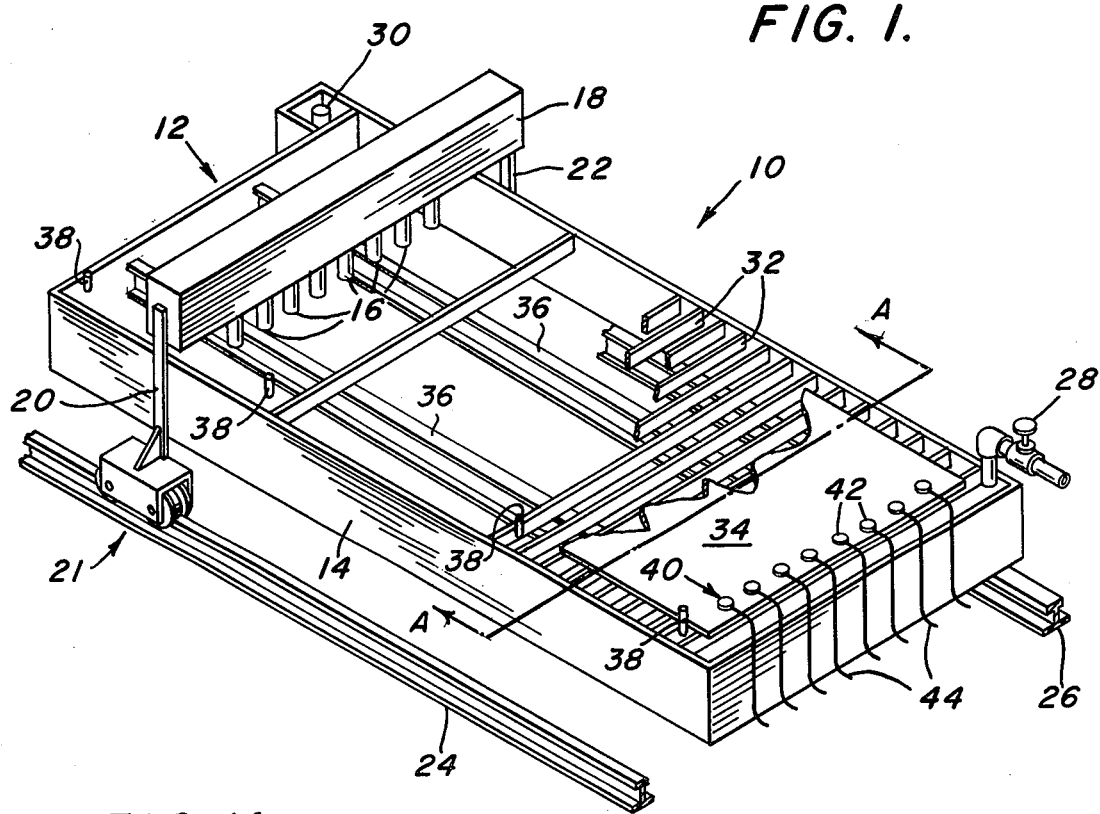
FIG. 1 is a perspective view of the cutting table according to the present invention with portions of the plasma-jet arrangement with which the table is associated.
Figure 1A:
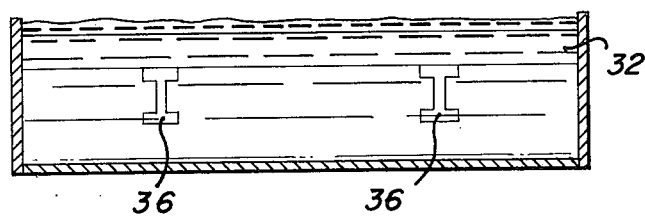
FIG. 1A is a sectional view of the apparatus of FIG. 1 taken through lines A—A.

Looking at FIG. 1, there is shown a plasma-jet cutting assembly with an associated cutting table at 10. The assembly 10 includes a plasma-jet cutting arrangement 12 and a water-filled cutting table 14. The plasma-jet cutting arrangement 12 is formed having a plurality of plasma jets 16, which are supported in an operable position by a housing 18. Both the housing 18 and the jets 16 are supported on vertical support members 20 and 22 on either side of the housing 18. Suitable means, as at 21, are provided along the bottoms of support members 20 and 22, such that the plasma-jet cutting arrangement 12 may move along support rails 24 and 26, located on either side of the cutting table 14 from one end of the cutting table to the other. The specific configuration and operation of plasma jets is well known in the art and will not be discussed in further detail here.

Due to the intense heat and obnoxious fumes generated by the plasma jet, a water-filled cutting table, which supports the product to be cut, is provided in association with the plasma-jet cutting arrangement 12. The table 14 is generally rectangular in shape and is configured as a water-tight container including a water inlet 28 and a water-level adjustment drain 30 located therein. Through the use of these two elements, the water level of the water contained in the cutting table may be adjusted. Extending across the width of the cutting table 14 are a plurality of support slats 32. The product support slats 32 are oriented on edge and support the product 34 which is to be cut by the plasma-jet cutting arrangement 12. Positioned below the product support slats 32 are longitudinally-oriented slat supports 36 which may be formed from steel or the like, and which lend support to the non-combustible polyvinyl chloride support slats 32. Located along one edge of the table 14 are product alignment stops 38 which provide for an alignment of the product 34 when it is placed on the table. Also associated with the assembly 10 are a plurality of magnetic grounding devices as at 40, the purpose of which will become apparent below. The grounding devices 40 generally include a magnet 42 and a lead wire or the like 44 which connects the magnet to an electrical ground.

Figure 2:
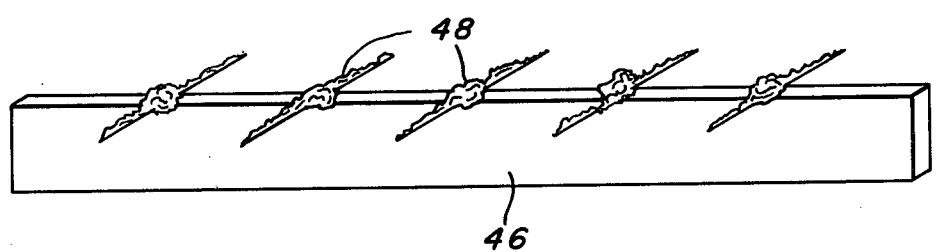
FIG. 2 is a perspective view of a portion of a cutting table without the incorporation of the advantages of the present invention, and is labeled PRIOR ART.

As previously noted, the product support slats 32 are composed, in the preferred embodiment of the invention, of polyvinyl chloride. The reasons for the use of polyvinyl chloride or any other material which is self-extinguishing and combustibly non-supportive may be best understood by noting exactly what happens to the same supports when the are composed of steel. In this regard, reference should be made to FIG. 2, labeled PRIOR ART, wherein there is shown a presently used steel slat with its associated slag build-up. The support slats of the cutting table support the product 34 just above or just below the surface of the water within the table 14. In either case, the slats are subjected to direct impingement of the plasma jet during the cutting operation. It is during this cutting operation that slag from the product is generated and, in the case of presently used steel slatting, builds up as shown in FIG. 2. The steel slat 46 has a number of slag build-ups 48 located thereon, the number of slag build-ups being representative of the number of plasma jet 16 located in the plasma-jet cutting arrangement 12. For instance, in FIG. 2 there are five slag build-ups which indicate that five torches were used to cut the product into six different sections. As may be evidenced from FIG. 2, the slag build-up begins to grow directly on the steel slat and grows normal to the steel slat in a direction parallel to the direction of movement of the plasma jet as arrangement 12 is moved from one end of the cutting table to the other. The slag build-up 48 located on the steel slat 46 presents an uneven support for subsequent products to be cut on the plasma-jet cutting table, thereby effecting both the quality of the cut and the product itself.

In order to alleviate the problem of slag build-up inherent when steel slats are used to support the product, applicant has proposed the use of combustibly non-supportive and self-extinguishing slats. Exemplary of such materials are those from the group of Nylon, Zytel (6/12 or 6/6 Nylon), Teflon T.F.E. (Polytetrafluoroethylene) and glass reinforced Valox (polybutyleneterathylate). As indicated previously, polyvinyl chloride has been used by applicant with great success in this regard and is, therefore, considered the preferred embodiment of the present invention. When the slats 32 are composed of polyvinyl chloride or one of the other materials just noted, slag generated by the cutting of the product does not adhere to the slat itself and falls harmlessly into the water. While some scorching and cutting of the slat 32 occurs, it is minimal, and the slat may be either turned over or trimmed should this cutting become too severe. The use of polyvinyl chloride or one of the other materials which are combustibly non-supportive and which are self-extinguishing has an additional advantage. Inasmuch as the slats 32 are located under the level of water within the table 14, their non-metallic makeup presents no problem of rusting.

The prior use of steel slats for supporting the product 34 on the table just above the water level provided a convenient manner in which to ground the product 34. A ground wire was attached from ground to the table 14 and, due to the electrical conductivity of the steel, the ground from the table was passed through the slat and to the product 34. In order to provide a grounding of the product 34 under the present configuration of the cutting table 14, the magnetic grounding devices 40 and wires 44 are employed. Grounding of the product is necessary in plasma arc cutting inasmuch as an anode-cathode arrangement must be present between the plasma jet and the product to be cut. Normally, the plasma jet 16 has an electrode incorporated therein which is the cathode. The workpiece, due to its grounding, is configured as the anode and must be grounded throughout the entire cutting operation of the plasma jets. Consequently, the magnetic grounding devices are attached to the product in a number which is equal the number of pieces into which the product will be cut by the plasma-jet cutting arrangement 12. The use of the magnetic grounding elements 40 precludes the development of a grounding loop, causing current feedback to the power supply for the plasma-jet arrangement.

Figure 3A:
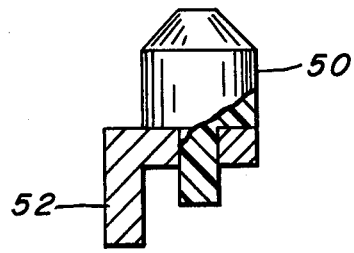
FIGS. 3a, b, c are several alternate embodiments of portions of the cutting table according to the present invention.
Figure 3B:
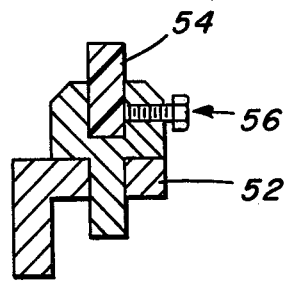
Figure 3C:
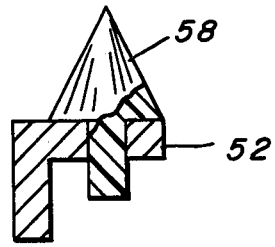
Figure 4:
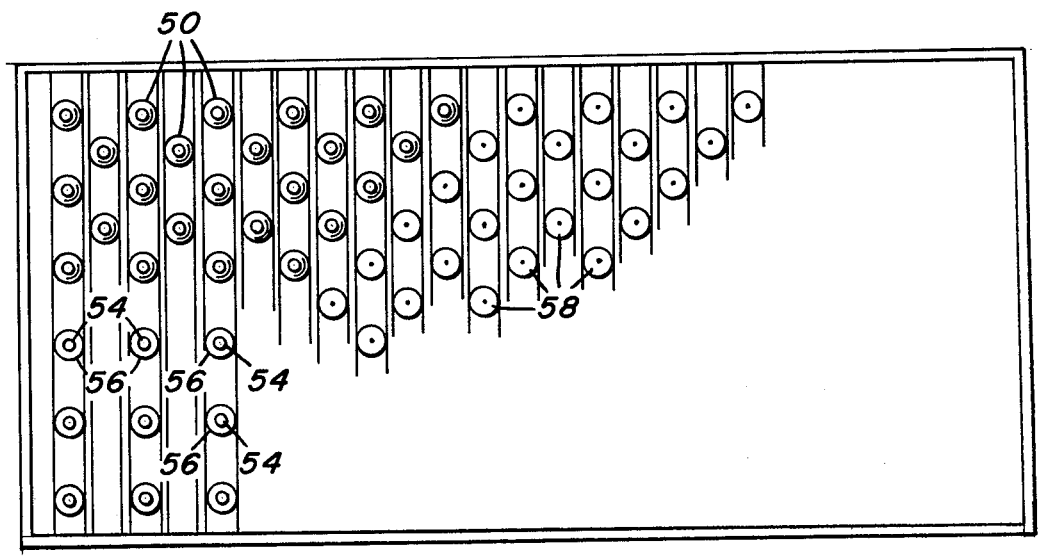
FIG. 4 is an alternate cutting table according to the present invention which incorporates, in part, the alternate embodiments indicated in FIGS. 3a, b and c.

Looking to FIGS. 3a, b, and c and FIG. 4, there are shown alternative embodiments of the present invention. FIGS. 3a, 3b, and 3c indicate the use of point supports for the product in an arrayed manner as shown in FIG. 4. Specifically, FIG. 3a uses a truncated polyvinyl chloride cone 50 which is attached to a support angle 52. The support angle 52 are oriented such that they span the width of the cutting table and provide support for a plurality of polyvinyl chloride cones 50. Similarly, FIG. 3b shows an arrangement utilizing the same angle 52 with the added features that a polyvinyl chloride rod 54 may be releasably inserted into a rod holding device such as that shown at 56. Again, the angle 52 would span the width of the table and provide support for a plurality of the polyvinyl chloride rods and holding devices 54 and 56, respectively. FIG. 3c shows the use of a polyvinyl chloride cone 58 and its associated angle 52. Again, the angle 52 would span the width of the table and provide support for a plurality of polyvinyl chloride cones 58. These three different arrays are shown in the different segments of FIG. 4. It should be noted again, that while the truncated cone 50, the rod 54, and the cone 58 were described in the context of polyvinyl chloride, it is intended that this description was only an example and the other combustibly non-supportive and self-extinguishing materials noted might be substituted. Again, due to the fact that all of the materials discussed in that group are electrically non-conductive, the magnetic grounding devices 40 would again have to be utilized in the table shown in FIG. 4 in the same manner they are used in conjunction with the table in FIG. 1.

The use of polyvinyl chloride or other combustibly non-supportive and self-extinguishing material for support slats within a plasma arc cutting table provides a variety of advantages over existing water tables. These advantages include the lack of slag build-up on the supporting slabs. Additionally, there is greater safety to the operator of the plasma-jet cutting arrangement 12 due to the fact that the product is now positively grounded by the use of the grounding devices. The use of the polyvinyl chloride slats reduces both the initial as well as operating costs of the table. Further, the use of the polyvinyl chloride slats reduces the amount of downtime and labor expense necessary to clean the slag from the supports when they are made from steel. It should also be noted that the polyvinyl chloride slats may be easily substituted for one another such that any trimming or other work to be done to the slats per se may be done after the substitution. Consequently, the table will not be subjected to extended downtime. It should be obvious that a table employing steel slats would have to be closed down for the period of repairs, thereby increasing the expense involved in maintenance.

While certain changes may be made in the above-noted system and assembly without departing from the scope of the invention herein involved, it is intended that all material contained in the above description or shown in the accompanying drawings shall be interpreted as illustrative and not in a limiting sense.

I claim:

1. A cutting table for a movable plasma-arc torch cutting arrangement, said cutting table being adapted to receive and support a metallic product to be cut into a given number of sections by the torch arrangement, said cutting table comprising:

a container adapted to retain a quantity of water or the like, having a length and width greater than the product to be cut;

non-metallic support means periodically located within said container for supporting the product to be cut at a level just above the water contained within said container, said support means being self-extinguishing, combustibly non-supportive and being of a material characterized in releasing, to the water in said container, any slag formed as a result of cutting such metallic product; and means, releasably attachable to such product to be cut, for grounding the product to be cut during the total time the product is being cut, such that plasma-arc torch arrangement may operate.

2. The cutting table according to claim 1 in which said support means are slats, oriented on edge and extending across the width of said container in a direction normal to the direction of travel of such plasma-arc torch arrangement.

3. The cutting table according to claim 1 in which said support means are slats formed from self-extinguishing and combustion non-supporting synthetic material, said slats being oriented on edge and extending across the width of said container in a direction normal to the direction of travel of such plasma-arc torch arrangement.

4. The cutting table according to claim 1 in which said means for grounding such product to be cut include means which magnetically attaches itself to such product.

5. The cutting table according to claim 1 in which said means for grounding such product to be cut include a plurality of magnets equal in number to the number of pieces into which such product is to be cut, each piece having a magnet associated with it, and means for connecting each of said magnets to ground.

6. The cutting table according to claim 1 in which said support means are a plurality of substantially point supports arrayed periodically substantially throughout the entire length and width of said container.

7. The cutting table according to claim 6 in which said point supports may be configured having a shape from the group of composed cones, truncated cones, and rod segments.

8. The cutting table according to claim 6 in which said point supports may be configured having a shape from the group of composed cones, truncated cones, and rod segments, said point supports being formed of self-extinguishing and combustion non-supporting plastic materials.

9. The cutting table according to claim 1 in which said table further includes longitudinal support elements oriented parallel to the direction of travel of such plasma-arc torch cutting arrangement for supporting said support means.

10. The cutting table according to claim 3 in which said support means are slats formed from Nylon.

11. The cutting table according to claim 3 in which said support means are slats formed from polytetrafluoroethylene.

12. The cutting table according to claim 3 in which said support means are slats formed from polybutylenetherathylate.

13. The cutting table according to claim 8 in which said point supports are formed from Nylon.

14. The cutting table according to claim 8 in which said point supports are formed from polytetrafluoroethylene.

15. The cutting table according to claim 8 in which said point supports are formed from polybuteleneterathylate.

* * * * *